US012711545B2

(12) United States Patent
Kesiboyana et al.

(10) Patent No.: US 12,711,545 B2
(45) **Date of Patent: *Aug. 18, 2026**

(54) SYSTEM AND METHOD FOR INTERFACING WITH A DECISIONING SERVICE FROM A THIRD PARTY DOMAIN

(71) Applicant: Capital One Services, LLC, McLean, VA (US)

(72) Inventors: Satish Kesiboyana, Plano, TX (US); Rajaboopathy Vijayaraghavan, Carrollton, TX (US); Kush Patel, Austin, TX (US); Jeffrey Roberts, Keller, TX (US); Dustin Ryan Nation, The Colony, TX (US); Jonathan Darling, Richardson, TX (US); Venkata Sudharsan Dasa, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 103 days.

This patent is subject to a terminal disclaimer.

(21) Appl. No.: 18/794,119

(22) Filed: Aug. 5, 2024

(65) Prior Publication Data

US 2025/0036806 A1 Jan. 30, 2025

Related U.S. Application Data

(63) Continuation of application No. 18/141,633, filed on May 1, 2023, now Pat. No. 12,056,257, which is a (Continued)

(51) Int. Cl.
*G06Q 40/03* (2023.01)

(52) U.S. Cl.
CPC ................................ *G06Q 40/0305* (2025.08)

(58) Field of Classification Search
CPC ........................... G06Q 40/03; G06Q 40/0305
See application file for complete search history.

(56) References Cited

U.S. PATENT DOCUMENTS 8,433,650 B1 4/2013 Thomas
10,417,706 B1 * 9/2019 Simon ................ G06Q 30/0643
(Continued)

FOREIGN PATENT DOCUMENTS

AU 2015203014 A1 1/2016
EP 1175654 A2 1/2002
(Continued)

OTHER PUBLICATIONS

"Nor and Yusof, Loan Assessment Through Internet, Jul. 17, 2002, IEEE, Student Conference on Research and Development, entire document" (Year: 2002).*
(Continued)

*Primary Examiner* — Abhishek Vyas
*Assistant Examiner* — Adam Hilmantel
(74) *Attorney, Agent, or Firm* — Sterne, Kessler, Goldstein & Fox P.L.L.C.

(57) ABSTRACT

A system for interfacing with a decisioning service from a third-party domain. A backend system may receive a request to interface with the decisioning service to generate a prequalification result for a user for a specified product, in response to the actuation of a button included in a third-party web domain rendering a product. The backend system may execute a call on a website of the decisioning service. The backend system may receive the product information from the button. The backend system may generate the website within the third-party domain, including a request for information about the user, in response to executing the call to the website. The backend system may transmit a request for generating prequalification result for the product to the (Continued)

decisioning service. The backend system may receive the prequalification result from the decisioning service.

20 Claims, 6 Drawing Sheets

Related U.S. Application Data continuation of application No. 17/830,558, filed on Jun. 2, 2022, now Pat. No. 11,687,882, which is a continuation of application No. 16/882,291, filed on May 22, 2020, now Pat. No. 11,354,735.

(60) Provisional application No. 62/852,202, filed on May 23, 2019.

(56) References Cited

U.S. PATENT DOCUMENTS

| | | | | |
|---|---|---|---|---|
| 11,354,690 | B2 | 6/2022 | Kesiboyana et al. | |
| 11,481,827 | B1 * | 10/2022 | Cain | G07C 5/08 |
| 11,909,836 | B2 | 2/2024 | Wulf | |
| 2004/0117295 | A1 * | 6/2004 | Maliwanag | G06Q 40/03 705/38 |
| 2011/0087577 | A1 * | 4/2011 | Slavin | G06Q 40/02 705/37 |
| 2014/0040113 | A1 | 2/2014 | Emswiler | |
| 2014/0172531 | A1 | 6/2014 | Liberty et al. | |
| 2014/0249991 | A1 * | 9/2014 | MacInnis | G06Q 40/03 705/38 |
| 2015/0058109 | A1 | 2/2015 | Lange | |
| 2015/0074644 | A1 | 3/2015 | Oberheide et al. | |
| 2015/0206234 | A1 * | 7/2015 | Forrester | G06Q 40/03 705/38 |
| 2015/0379632 | A1 | 12/2015 | Michael | |
| 2016/0134932 | A1 | 5/2016 | Karp et al. | |
| 2016/0171555 | A1 | 6/2016 | Buerger et al. | |
| 2016/0267588 | A1 * | 9/2016 | Cain | G06Q 40/03 |
| 2016/0283203 | A1 * | 9/2016 | Li | G06F 16/958 |
| 2016/0371770 | A1 * | 12/2016 | Porter | G06F 16/2379 |
| 2018/0039494 | A1 | 2/2018 | Lander et al. | |
| 2018/0053253 | A1 * | 2/2018 | Gokhale | G06Q 40/03 |
| 2019/0138995 | A1 | 5/2019 | Currin et al. | |
| 2020/0051153 | A1 * | 2/2020 | Chrzan | G06Q 30/0282 |
| 2020/0371779 | A1 | 11/2020 | Kesiboyana et al. | |
| 2020/0372519 | A1 | 11/2020 | Repaka et al. | |
| 2020/0372531 | A1 | 11/2020 | Kesiboyana et al. | |
| 2020/0372577 | A1 | 11/2020 | Kesiboyana et al. | |
| 2022/0292598 | A1 | 9/2022 | Kesiboyana et al. | |
| 2022/0292599 | A1 | 9/2022 | Kesiboyana et al. | |
| 2023/0259881 | A1 | 8/2023 | Kesiboyana et al. | |
| 2023/0409306 | A1 | 12/2023 | Kolesov et al. | |
| 2023/0410967 | A1 | 12/2023 | Campellone et al. | |

FOREIGN PATENT DOCUMENTS

| | | | | |
|---|---|---|---|---|
| WO | 0046717 | A2 | 8/2000 | |
| WO | WO-2005010731 | A2 * | 2/2005 | G06Q 40/03 |

OTHER PUBLICATIONS

Muath Alfawzan et al. Personal Loans Comparison Websites in Saudi Arabia: Challenges and Proposed Solution. 2018. 21st Saudi Computer Society National Computer Conference (NCC) (pp. 1-8). (Year: 2018).

Kantamneni, Nupur. Introducing Affirm Prequalification: Learn how it changes customer shopping behavior. Date: Jul. 25, 2018. https://www.affirm.com/business/blog/prequalification (Year: 2018).

* cited by examiner

SYSTEM AND METHOD FOR INTERFACING WITH A DECISIONING SERVICE FROM A THIRD PARTY DOMAIN

CROSS-REFERENCE TO RELATED APPLICATIONS

This application is a continuation application of U.S. application Ser. No. 18/141,633, filed May 1, 2023, which is a continuation application of U.S. application Ser. No. 17/830,558, filed on Jun. 2, 2020, which claims priority to U.S. application Ser. No. 16/882,291, filed on May 22, 2020, which claims priority to Provisional Application No. 62/852,202, filed on May 23, 2019, the contents of each of the applications are hereby incorporated by reference in their entirety.

BACKGROUND

Many entities provide users the ability to view and purchase their products online. However, in the event the product is to be purchased using financing from a lender, the user is forced to visit a different website in a different window or tab and manually enter the product information. Furthermore, a user may have to search for a lender to provide the loan. The user may lose interest in the product if they have to navigate from the site and find a lender to provide the loan. Furthermore, conventional systems provide generic financing information to users. The users may be presented with ranges of loan pricing structures that are not specifically tailored to a specific product or user until the user requests to generate a final pricing structure.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Figure 1:
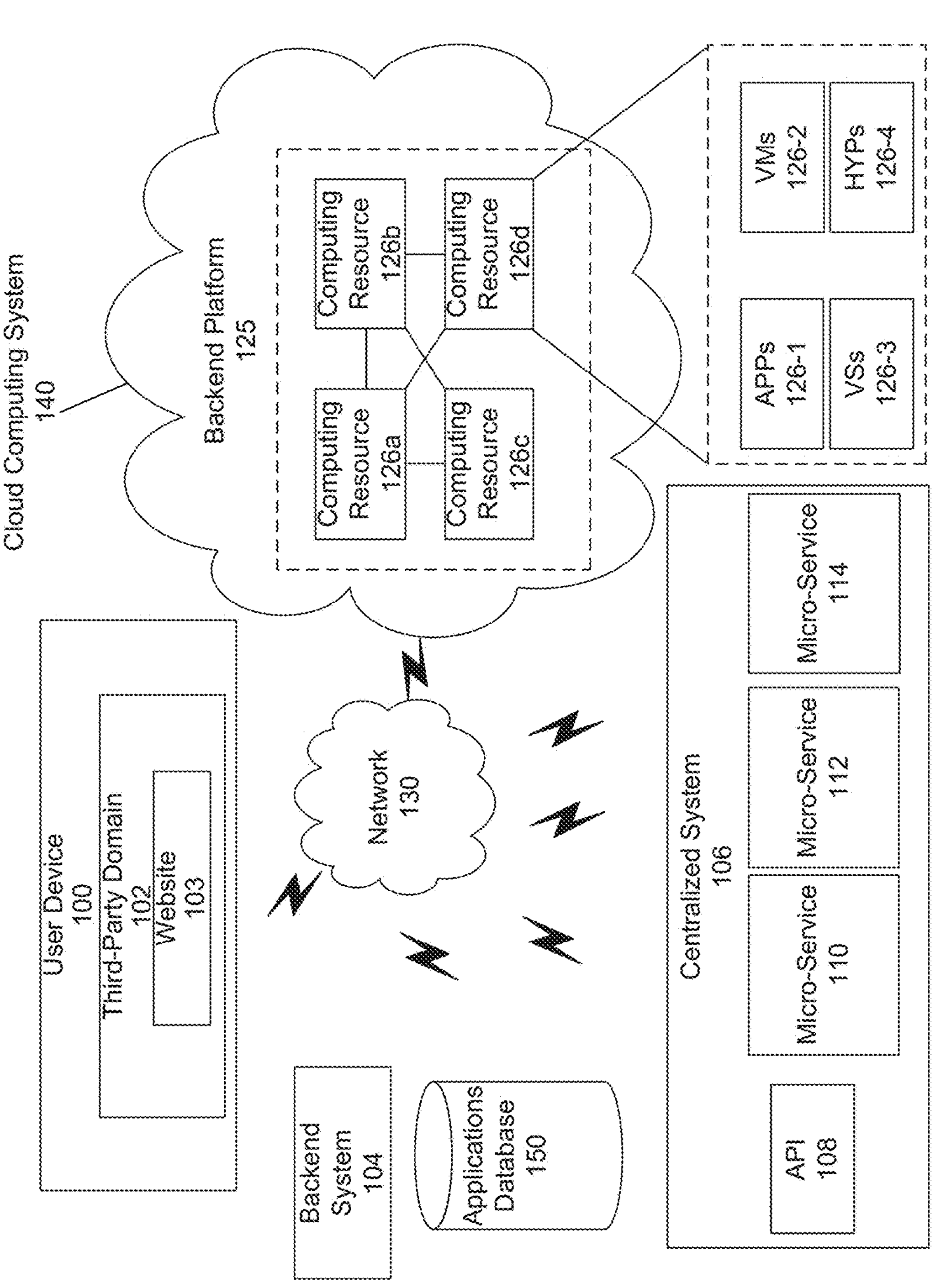
FIG. 1 is a block diagram of an example network environment implementing the system for interfacing with a decisioning service according to an example embodiment.

Provided herein is a system for interfacing with a decisioning service from a third-party domain. A backend system may receive a request to interface with the decisioning service to generate a prequalification result for a user for a specified product, in response to the actuation of a button included in a third-party web domain rendering the product. The button may include information about the product. The backend system may execute a call on a webpage of the decisioning service. The backend system may receive the product information from the button, in response to actuation of the button. The backend system may generate the website within the third-party domain, including a request for information about the user, in response to executing the call to the website. The backend system may transmit a request for generating the prequalification result for the product to the decisioning service the request including information about the user, the product, and the third party. The backend system may receive the prequalification result from the decisioning service. The backend system can generate actionable loan pricing information using the prequalification result and render the loan pricing information (e.g., projected payments and APR) on a GUI.

In an embodiment, the backend system may retrieve prequalification information for particular a lender. The lender's prequalification information may include prequalification rules, methodologies, or algorithms, on how to process prequalification requests. The backend system may generate a prequalification result for the user using the user's information, the received credit information, information about the specific product, information about the third-party, and the prequalification information for the lender. The backend system can use the lender's prequalification information and product information to determine whether the product is eligible for a loan. Once, the decisioning service 112 confirms that the product is eligible for a loan from the lender, the decisioning engine 110 can generate the prequalification result using the user's information, the received credit information, information about the specific product, information about the third-party, and the prequalification information for the lender. The prequalification result can include a specific APR and pricing information for the specific user and product. This can be an actionable prequalification result. That is, the user can select this prequalification result to obtain a final loan-pricing offer that includes the same APR and pricing information for the specific user and product as in the prequalification result.

For example, in the event a user selects the prequalification result, the backend system can generate a final pricing structure for the specific product using the prequalification result for the vendor. In particular, the decisioning service 114 may process and build a loan pricing structure based on the information associated with the request for building an offer for the lender using the previously generated prequalification result. The pricing structures may include loan amounts, interest rates, and terms and conditions of the automobile loan. The pricing structures may include the information of the prequalification result. For example, the pricing structure may include the APR and projected payments included in the prequalification result. The final pricing structure may include the same APR and pricing information for the specific user and product included in the prequalification result. For example, a user can select a prequalification result with a click of a button to generate a final pricing structure with the same information as in the prequalification result without leaving the window of the third-party domain.

In other embodiments, the backend system may retrieve prequalification information associated with various lenders from a self-contained environment such as a vault. The various lenders can upload their prequalification information in the vault. The prequalification information include rules, methodologies, or algorithms on how to process prequalification requests that may be executed in parallel in a secured controlled environment or vault. The methodologies may include using Bayesian regression algorithms, decision trees, pricing grids, or various equations to price a loan offer. The methodologies may also provide sources for retrieving certain information. The backend system may process, in parallel, the user's prequalification request for each of the various lenders using the user's information, the received credit information, information about the specific product, information about the third-party, and the prequalification information associated with each respective lender. As described above, the prequalification may be different for each lender. For example, each lender may require different thresholds of employment information, salary, and/or credit scores.

The backend system may retrieve product eligibility information associated with the lenders, which prequalified the user based on the prequalification results. The backend system may determine, in parallel, whether the specific product is eligible for a loan from a given lender based on the information associated with the specific product and information associated with product eligibility for each of the respective lenders. The backend system may generate prequalification results in response to processing the user's prequalification request for each of the multiple lenders and in response to the product being eligible for each of the multiple lenders for which the product is deemed eligible for a loan. These can be an actionable prequalification results. That is, the user can select one of the prequalification results to generate a final loan-pricing offer that includes the APR and pricing information for the specific user and product. The APR and pricing information can be the same as in the selected prequalification result.

The system provides for automatically capturing product and seller information from a third-party domain for generating prequalification results, using information encoded in the button. The system can receive this information from a button, in response to actuation of the button, and use the information to generate the prequalification results. Furthermore, the system may transmit a prequalification request and receive prequalification results all within the same window as the third-party domain. By doing so, this configuration avoids inputting information manually and eliminates the need to process the same data repeatedly. Furthermore, this configuration avoids inputting incorrect information, and therefore, avoids processing incorrect information. In light of this, the system increases operational efficiency and reduces the number of computational resources needed to implement the system.

Furthermore, this configuration provides for generating actionable prequalification results for the specific user. That is, the prequalification results can include projected payment and APR information specific for the user. So, if the user decides to proceed with a purchase, a prequalification result can be used to generate a final loan pricing offer, which shares the same data (e.g., projected payment and APR information) as the prequalification result. As a result, a user may obtain actionable prequalification results for a given product from a third-party lender all within the same window as the third-party domain. For example, a user can select a prequalification result with a click of a button to generate a final pricing structure with the same information as in the prequalification result without leaving the window of the third-party domain.

FIG. 1 is a block diagram of an example environment in which systems and/or methods described herein may be implemented. The environment may include a user device 100, a backend system 104, a centralized system 106, a backend platform 125, a cloud computing environment 140, an applications database 150, and a network 130. The devices of the environment may be connected through wired connections, wireless connections, or a combination of wired and wireless connections. The backend system 104 and the centralized system 106 may reside fully or partially on the cloud computing system 140. The user device 100 may include a third-party domain 102, such as a website 103. The centralized system 106 may include an application program interface (API) 108 and decisioning services 110-114. As an example, decisioning service 110 may be configured to generate prequalification results for loans. Decisioning service 112 may be configured to determine product eligibility for loans. Decisioning service 114 may be configured to generate pricing structures for loans. The decisioning services 110-114 can be micro-services or applications. The centralized system 106 may be a vault. The vault may be a self-contained environment configured to securely generate prequalification results, product eligibility results, and pricing structures. The centralized system 106 may interface with other systems/devices using the API 108.

In an example embodiment, one or more portions of the network 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 125 may include a server or a group of servers. In an embodiment, the backend platform 125 may be hosted in a cloud computing environment 140. It may be appreciated that the backend platform 125 may not be cloud-based, or may be partially cloud-based. The backend system 104 and centralized system 106 may include one or more devices configured to interface with the backend platform 125.

The cloud computing environment 140 includes an environment that delivers computing as a service, whereby shared resources, services, etc. may be provided to the backend platform 125. The cloud computing environment 140 may provide computation, software, data access, storage, and/or other services that do not require end-user knowledge of a physical location and configuration of a system and/or a device that delivers the services. The cloud computing system 140 may include computer resources 126*a-d*.

Each computing resource 126*a-d* includes one or more personal computers, workstations, server devices, or other types of computation and/or communication devices. The computing resource(s) 126*a-d* may host the backend platform 125. The cloud resources may include compute instances executing in the computing resources 126*a-d*. The computing resources 126*a-d* may communicate with other computing resources 126*a-d* by wired connections, wireless connections, or a combination of wired and wireless connections.

Computing resources 126*a-d* may include a group of cloud resources, such as one or more applications ("APPs") 126-1, one or more virtual machines ("VMs") 126-2, virtualized storage ("VS") 126-3, and one or more hypervisors ("HYPs") 126-4.

Application 126-1 may include one or more software applications that may be provided to or accessed by backend system 104 or the centralized system 106. Alternatively, the application 126-1 may eliminate a need to install and execute software applications on the user device 100. The application 126-1 may include software associated with backend platform 125 and/or any other software configured to be provided across the cloud computing environment 140. The application 126-1 may send/receive information from one or more other applications 126-1, by the virtual machine 126-2.

Virtual machine 126-2 may include a software implementation of a machine (e.g., a computer) that executes programs like a physical machine. Virtual machine 126-2 may be either a system virtual machine or a process virtual machine, depending upon the use and degree of correspondence to any physical machine by virtual machine 126-2. A system virtual machine may provide a complete system platform that supports the execution of a complete operating system (OS). A process virtual machine may execute a single program and may support a single process. The virtual machine 126-2 may execute on behalf of a user and/or on behalf of one or more other backend platforms 125 and may manage the infrastructure of the cloud computing environment 140, such as data management, synchronization, or long-duration data transfers.

Virtualized storage 126-3 may include one or more storage systems and/or one or more devices that use virtualization techniques within the storage systems or devices of computing resources 126*a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 126-4 may provide hardware virtualization techniques that allow multiple operating systems (e.g., "guest operating systems") to execute concurrently on a host computer, such as computing resources 126*a-d*. Hypervisor 126-4 may present a virtual operating platform to the guest operating systems and may manage the execution of the guest operating systems multiple instances of a variety of operating systems and may share virtualized hardware resources.

In an embodiment, a user may launch a third-party domain 102 on a user device 100. The third-party domain 102 may be a seller website, configured to present products available for purchase. A user may select a specific product on the third-party domain 102. The third-party domain 102 may render information specific to the selected product. The third-party domain 102 may also render various links or buttons related to the purchase of the product. One of the links or buttons may include a link or button associated with transmitting to a lender a prequalification request for a loan for purchasing the specified product.

In response to the actuation of the link or button included in a third-party web domain rendering a product, the backend system 104 may receive a request to interface with the decisioning service 109. The request may be routed to decisioning service 110 for generating prequalification results for a specific product. The link or button may include information about the specific product. For example, metadata such as product name, VIN number, price, physical details, and/or the like may be embedded in the link or button. The information about the specific product may be included in the properties of the button. In other embodiments, the backend system 104 may use a scraping software that may be used to extract the information about the specific product from the third-party domain 102.

In response to the request to interface with the decisioning service 110, the backend system 104 may execute an automated script. The automated script may generate a call to a website 103. The backend system 104 may receive the information about the specific product and third party domain from the properties of the button, in response to actuation of the button. For example, in response to a user actuating the button, an action can be triggered to transmit a request to generate a prequalification result for the specific product along with the information about the specific product and the third product. This way, the backend system 104 may receive the most accurate information about the product. The website 103 may be rendered on the user device 100 by embedding the website 103 in the third-party domain 102. The website 103 may be embedded in the third-party domain 102 as an Iframe. An Iframe is an inline frame which is an HTML document embedded in another HTML document. By doing so, the user may not have to open a new tab or browser to find a lender in order to complete the prequalification process. The website 103 may include a prompt for user information for generating the prequalification results. The information may include name, address, social security number, phone number, employment information, and/or the like. In response to receiving a submitted request, the website 103 may transmit the user information and the prequalification request to the backend system 104. The prequalification request may also include information about the specific product and the third-party. In an embodiment, the product information can include an identifier (e.g., VIN number). The backend system 104 can determine the third-party (e.g., a seller of the product) using the identifier. The backend system 104 can tie the request for the prequalification result to the third-party. The backend system 104 can also retrieve information about the third-party.

In other embodiments, the URL of the website may include information about the specific product and third-party (i.e., seller). The backend system can identify the third party using the information included in the URL.

The backend system 104 may receive the prequalification request and user information. The backend system 104 may interface with API 108 to forward the request to the decisioning service 110 for processing the prequalification request. The decisioning service 110 may interface with a third party credit bureau to retrieve user credit information using the user's personal information. The decisioning service 110 may request a third party credit bureau to initiate a soft pull. Soft pulls are soft credit inquires that do not affect the user's credit score.

In an embodiment, the decisioning service 110 may retrieve prequalification information for a lender. The lender's prequalification information may include prequalification rules, methodologies, or algorithms, on how to process prequalification requests. The decisioning service 110 may generate a prequalification result for the user using the user's information, the received credit information, information about the specific product, information about the third-party, and the prequalification information for the lender. For example, decisioning service 112 may call on decisioning service 110 to determine whether the product is eligible for a loan from the lender. The decisioning service 112 can use the lender's prequalification information and product information to determine whether the product is eligible for a loan. Once, the decisioning service 112 confirms that the product is eligible for a loan from the lender, the decisioning engine 110 can generate the prequalification result using the user's information, the received credit information, information about the specific product, information about the third-party, and the prequalification information for the lender. The prequalification result can include a specific APR and pricing information for the specific user and product. This can be an actionable prequalification result. That is, the user can select this prequalification result to obtain a final loan-pricing offer that includes the same APR and pricing information for the specific user and product as in the prequalification result.

For example, in the event a user selects the prequalification result, the decisioning engine 114 can generate a final pricing structure for the specific product using the prequalification result. In particular, the decisioning service 114 may process and build a loan pricing structure based on the information associated with the request for building an offer for the lender using information associated with pricing for each of the lender and the previously generated prequalification result. The pricing structures may include loan amounts, interest rates, and terms and conditions of the automobile loan. The pricing structures may include the information of the prequalification result. For example, the pricing structure may include the APR and projected payments included in the prequalification result. The final pricing structure may include the same APR and pricing information for the specific user and product included in the prequalification result. For example, a user can select a prequalification result with a click of a button to generate a final pricing structure with the same information as in the prequalification result without leaving the window of the third-party domain.

The decisioning service 110 may transmit the prequalification result to the backend system 104, via the API 108. The backend system 104 may format the prequalification result to be in a format compatible with the website 103. The backend system 104 may render the formatted prequalification result on the website 103.

In other embodiments, the decisioning service 110 may retrieve prequalification information associated with various lenders from a self-contained environment such as a vault. The various lenders can upload their prequalification information in the vault. The prequalification information include rules, methodologies, or algorithms on how to process prequalification requests that may be executed in parallel in a secured controlled environment or vault. The methodologies may include using Bayesian regression algorithms, decision trees, pricing grids, or various equations to price a loan offer. The methodologies may also provide sources for retrieving certain information. The decisioning service 110 may process, in parallel, the user's prequalification request for each of the various lenders using the user's information, the received credit information, information about the specific product, information about the third-party, and the prequalification information associated with each respective lender. As described above, the prequalification may be different for each lender. For example, each lender may require different thresholds of employment information, salary, and/or credit scores. Example processes and systems for determining prequalification results and pricing information using the vault and multi-lender platform are described in U.S. patent application Ser. No. 16/882,163, titled, "JAILED ENVIRONMENT RESTRICTING PROGRAMMATIC ACCESS TO MULTI-TENANT DATA" and U.S. patent application Ser. No. 16/882,112, titled, "INTELLIGENT PREPROCESSING ROUTING TO DECISIONING SERVICE", filed concurrently herewith, which are incorporated herein by reference in their entirety.

The decisioning engine 110 may call decisioning service 112 to retrieve product eligibility information associated with the lenders, which prequalified the user based on the prequalification results. The decisioning service 112 may determine, in parallel, whether the specific product is eligible for a loan from a given lender based on the information associated with the specific product and information associated with product eligibility for each of the respective lenders. The decisioning service 110 may generate prequalification results in response to processing the user's prequalification request for each of the multiple lenders and in response to the product being eligible for each of the multiple lenders for which the product is deemed eligible for a loan. In this regard, if the product is not eligible for a loan for a given lender, the decisioning engine 110 may generate a prequalification result for the given lender. The prequalification results can include a decision on whether the lender has prequalified a user for a loan for purchasing the specific product. Each prequalification result can include a specific APR and pricing information for the specific user and product. These can be an actionable prequalification results. That is, the user can select one of the prequalification results to generate a final loan-pricing offer that includes the APR and pricing information for the specific user and product. The APR and pricing information can be the same as in the selected prequalification result.

The decisioning service 110 may transmit the prequalification results to the backend system 104, via the API 108. The backend system 104 may format the prequalification results to be in a format compatible with the website 103. The backend system 104 may render the formatted prequalification results on the website 103. In an embodiment, the backend system may poll the decisioning service 110 for a response to the request for generating prequalification results.

In an embodiment, the website 103 may emit events in response to receiving inputs. The backend system 104 may receive the events. In response to receiving a specified input or after a specified amount of time has passed, the website 103 may emit an event corresponding to terminating the website. The backend system 104 may terminate the website 103 and direct the user device 100 to the third-party domain 102 rendering the specific product.

In an embodiment, the prequalification results may be stored in an applications database 150. The prequalification results may be used to generate pricing structures using a buyer or seller application. For example, a user device may transmit a pricing or purchase request for the specific product using a buyer application (not shown). The centralized system 106 may receive the pricing or purchase request. The centralized system 106 may retrieve the prequalification results from the applications database 150. The request may include information associated with the desired loan, such as the price of a specific product, down payment amount, loan amount, tax amount, dealer fees, service contract, GAP, and/or the like.

The decisioning service 114 may retrieve methodologies for building pricing structures associated for each of the one or more lenders. The decisioning service 114 may process and build, in parallel, a loan offer based on the information associated with the request for building an offer for each of the one or more lenders using information associated with pricing for each of the respective lenders and the previously generated prequalification result. The pricing structures may include loan amounts, interest rates, and terms and conditions of the automobile loan. The pricing structures may include the information of the prequalification result. For example, the pricing structure may include the APR and projected payments included in the prequalification result.

Figure 2:
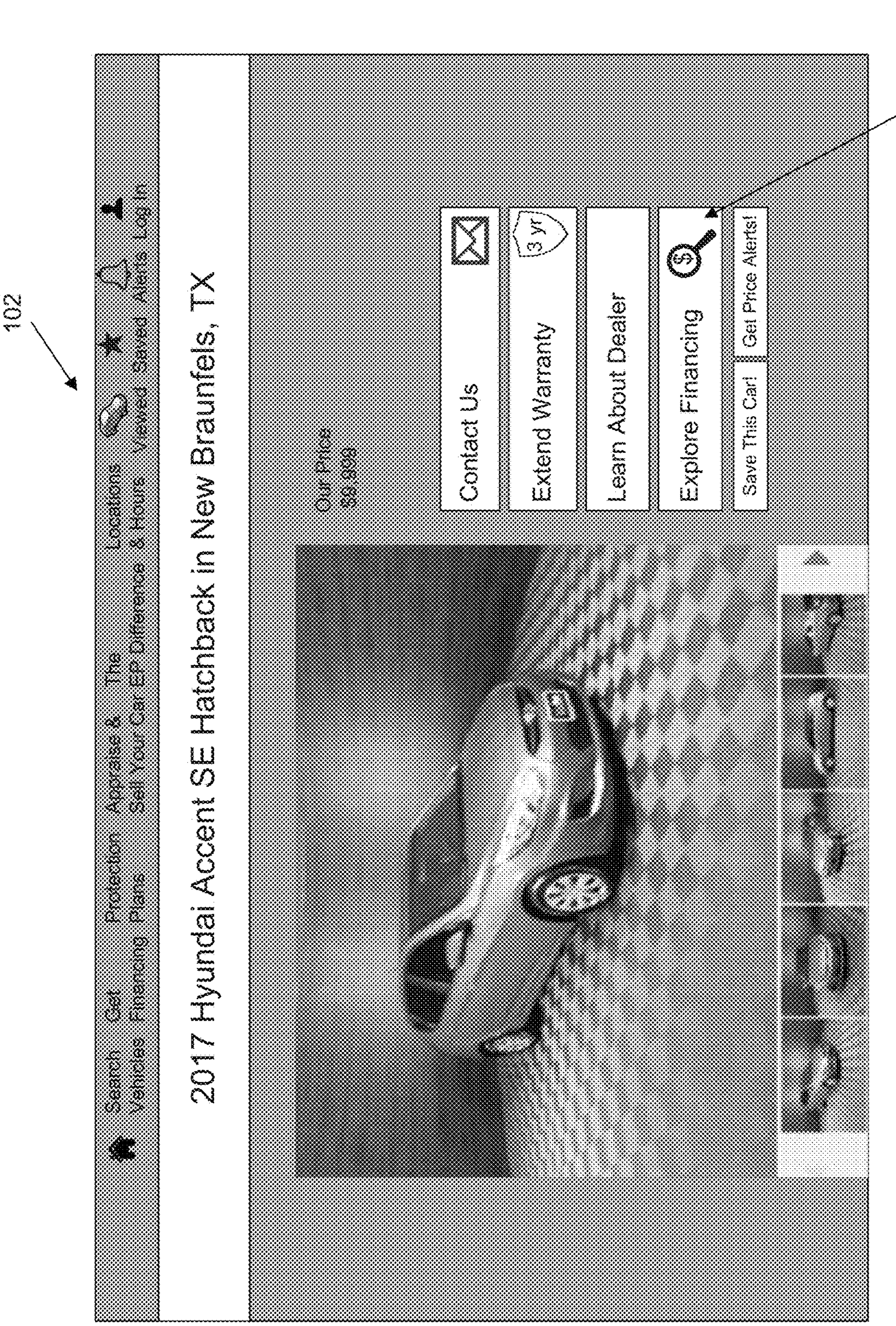
FIGS. 2-4 are example graphical user interfaces (GUI) for interfacing with a decisioning service according to an example embodiment.
Figure 3:
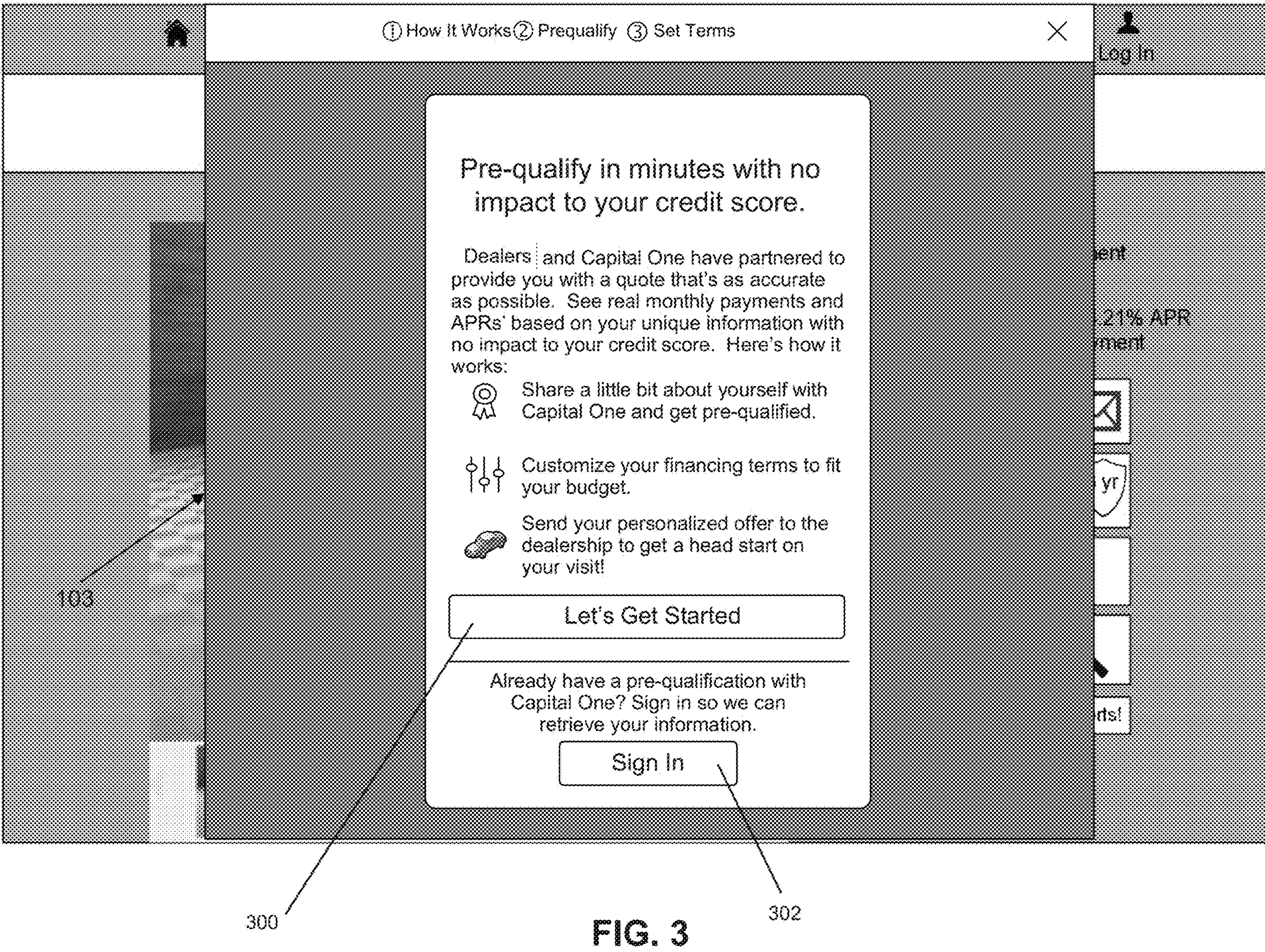
Figure 4:
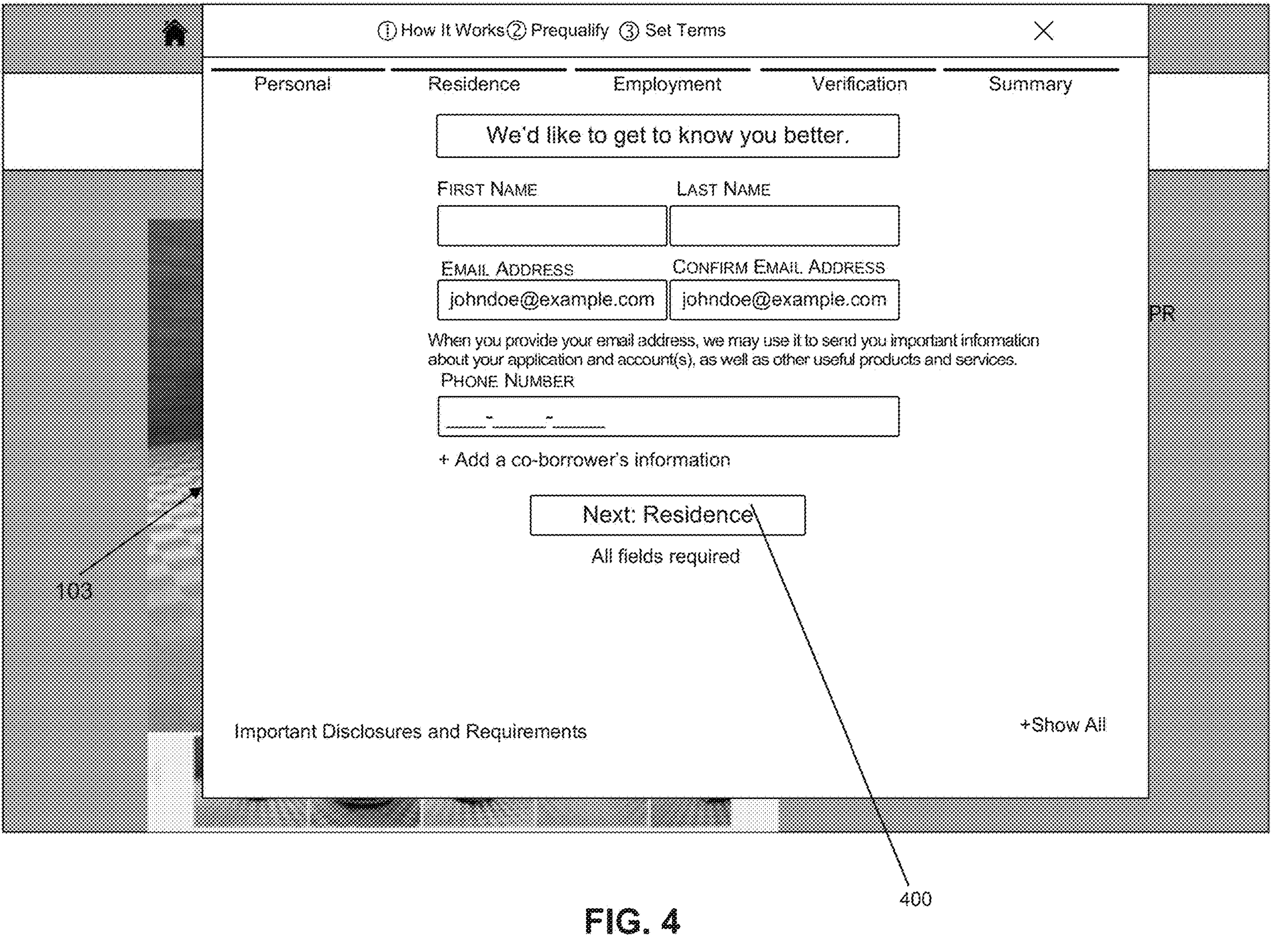

FIGS. 2-4 are example graphical user interfaces (GUIs) for interfacing with a decisioning service according to an example embodiment. FIGS. 2-4 will be described with respect to FIG. 1, concurrently. As a non-limiting example, the system interfacing with a decisioning service may be implemented to prequalify a potential buyer and receive prequalification results on an automobile loan for a specific vehicle. The third party-domain 102 may be a car dealership website. The products may be automobiles.

With reference to FIG. 2, a car dealership website may include various automobiles for sale. A user may launch the third-party domain 102 on a user device 100. A user may select a specific automobile on the third-party domain 102. The third-party domain 102 may render information specific to the selected automobile. For example, the information may include price, contact information, extended warranty information, and images of the automobile. The third-party domain 102 may also render various links or buttons related to the purchase of the product. One of the links or buttons may include a financing button 200. The financing button 200 may be associated with transmitting a prequalification request for a loan for purchasing the specified product. In an embodiment, the financing button 200 may be associated with transmitting a prequalification request for a loan for purchasing multiple products. In an embodiment, a financing button 200 may be associated with each of a plurality of products displayed in the GUI to enable user selection of a product specific prequalification request for any one or more of the displayed plurality of products.

In response to the actuation of the financing button 200 included in a third-party web domain 102 rendering a specific automobile, the backend system 104 may receive a request to interface with the decisioning service 110 for generating prequalification results for a specific product. The financing button 200 may include information about the specific product. For example, the button properties may include information such as a vehicle identification number (VIN), automobile make, model, name, year, price, and/or the like. In an embodiment, a scraping software may be used to extract the information about the specific automobile from the third-party domain 102.

In response to the request to interface with the decisioning service 110, the backend system 104 may execute an automated script. The automated script may generate a call to a website 103. The backend system 104 may receive the information about the specific automobile from the properties of the button in response to the actuation of the button. For example, a user can click the button to transmit a request to generate a prequalification result for a specific automobile. Clicking (e.g., actuating) the button can trigger an action to transmit the request to generate the prequalification result for the specific automobile along with the information about the automobile and the third-party domain (e.g., dealer), which is embedded in the properties of the button.

With reference to FIG. 3, the website 103 may be rendered on the user device 100 by embedding the website 103 in the third-party domain 102. The website 103 may lie within the window of the third-party domain, making the website 103 appear in that part of the third-party domain. The website 103 may be in the foreground, and the third-party domain 102 may be in the background. The URL of the website 103 may not be visible. The website 103 may be embedded in the third-party domain as an Iframe. This way, the user may interface with a financial institution to complete the prequalification process within the third-party domain window 102 and without navigating away from the third-party domain. The user may not have to open a different browser tab to find a lender or to complete the prequalification process. The website 103 may include information for transmitting a prequalification request. A user can proceed with inputting their personal information by clicking the "Let's Get Started" button 300. The "Let's Get Started" button may be a link to the next step in the process flow of completing the prequalification. The website 103 may also include a "Sign In" button 302. The "Sign In" button may be a link to a page on which a user may input their authentication details (e.g., username or password). Once a user is logged in, the user may retrieve previously generated prequalification results.

With reference to FIG. 4, in response to selecting the "Let's Get Started" button, the website 103 may be directed to pages prompting a user to input user information. The website 103 may include requests for user information for generating the prequalification results. The information may include name, address, social security number, phone number, employment information, and/or the like.

A first page includes input boxes for the first name, last name, email address, an input box for confirming the email address, and a phone number. The input boxes for the first name, last name, email address, confirmation of the email address, and phone number may accept alphanumeric text. The first page may further include a "+" button to input information for a co-borrower. In response to selecting the "+" button, the first page may expand to include input boxes for the first name, last name, email address, an input box for confirming the email address, and a phone number of the co-borrower. The first page may include a "Next: Residence" button 400. The "Next: Residence" button 400 may be a link to a second page.

The second page (not shown) may include input boxes for inputting home address information. The second page may include a button to progress to a third page. The button may be a link directing the website to the third page. After inputting the home address information, a user may progress to the third page.

The third page (not shown) may include input boxes for inputting employment information. The employment information may include the type of employment, the status of employment, length of time at current employer, salary, position, and/or the like. The third page may include a button to progress to a fourth page. The button may be a link directing the website to the fourth page. After inputting the employment information, the user may progress to a fourth page.

The fourth page (not shown) may prompt a user to verify the accuracy of the information provided by the user. The fourth page may include a button to progress to a fifth page. The button may be a link directing the website to the fifth page. After verifying the information, the user may progress to the fifth page.

The fifth page (not shown) may include a summary of all the input user information. The user may submit the prequalification request from the fifth page.

In response to receiving a submitted request, the website 103 may transmit the user information and the prequalification request to the backend system 104. The prequalification request may also include information about the specific product and the dealership.

The backend system 104 may receive the prequalification request and user information. The backend system 104 may interface with API 108 to forward the request to the decisioning service 110 for processing the prequalification request. The decisioning service 110 may interface with third party credit bureaus to retrieve user credit information using the user's personal information. The decisioning service 110 may request the third party credit bureaus to initiate a soft pull. Soft pulls are soft credit inquires that do not affect the user's credit score.

In an embodiment, the decisioning service 110 may retrieve prequalification information for a lender. The prequalification information for a lender may include the prequalification rules, methodologies, or algorithms, on how to process prequalification requests. The decisioning service 110 may generate a prequalification result for the user using the user's information, the received credit information, information about the specific product, information about the third-party, and the prequalification information for the lender. For example, decisioning service 112 may call on decisioning service 110 to determine whether the product is eligible for a loan. The decisioning service 112 can use the lender's prequalification information and product information to determine whether the product is eligible for a loan. Once, the decisioning service 112 confirms that the product is eligible for a loan, the decisioning engine 110 can generate the prequalification result using the user information (including the credit information), the product information, and the lender's prequalification information. The prequalification result can include a specific APR and pricing information for the specific user and product. This can be an actionable prequalification result. That is, the user can select this prequalification result to generate a final loan-pricing offer that includes the APR and pricing information for the specific user and product.

For example, in the event, a user selects the prequalification result, the decisioning engine 114 can generate a final pricing structure for the specific product using the prequalification result. The final pricing structure may include the same APR and pricing information for the specific user and product included in the prequalification result.

The backend system 104 may format the prequalification result to be in a format compatible with the website 103. The backend system 104 may render the formatted prequalification results on the website 103. For example, the button 200 can be replaced with the prequalification result. The prequalification information rendered on the website may include projected payment information and the APR.

In another embodiment, the decisioning service 110 may retrieve prequalification information associated with various lenders. The decisioning service 110 may process, in parallel, the user's prequalification request for each of the various lenders using the user's information, the received credit information, information about the specific automobile, information about the dealership, and the prequalification information associated with each respective lender.

The decisioning service 110 may generate prequalification results, in response to processing the user's prequalification request for each of the multiple lenders. The prequalification results can include a decision on whether the lender has prequalified a user for a loan for purchasing the specific product. In an embodiment, each prequalification result can include a specific APR and pricing information for the specific user and product. This can be an actionable prequalification result. That is, the user can select one of the prequalification results to generate a final loan-pricing offer that includes the APR and pricing information for the specific user and product. The APR and pricing information can be the same as in the selected prequalification result. The decisioning service 110 may transmit the prequalification results to the backend system 104, via the API 108. The backend system 104 may format the prequalification results to be in a format compatible with the website 103. The backend system 104 may render the formatted prequalification results on the website 103. For example, the button 200 can be replaced with the prequalification results.

In an embodiment, the website 103 may emit events in response to receiving inputs. The backend system 104 may receive the events. In response to receiving a specified input or after a specified amount of time has passed, the website 103 may emit an event corresponding to terminating the website. The backend system 104 may terminate the website 103 and direct the user device 100 to the third-party domain 102 rendering the specific product.

Figure 5:
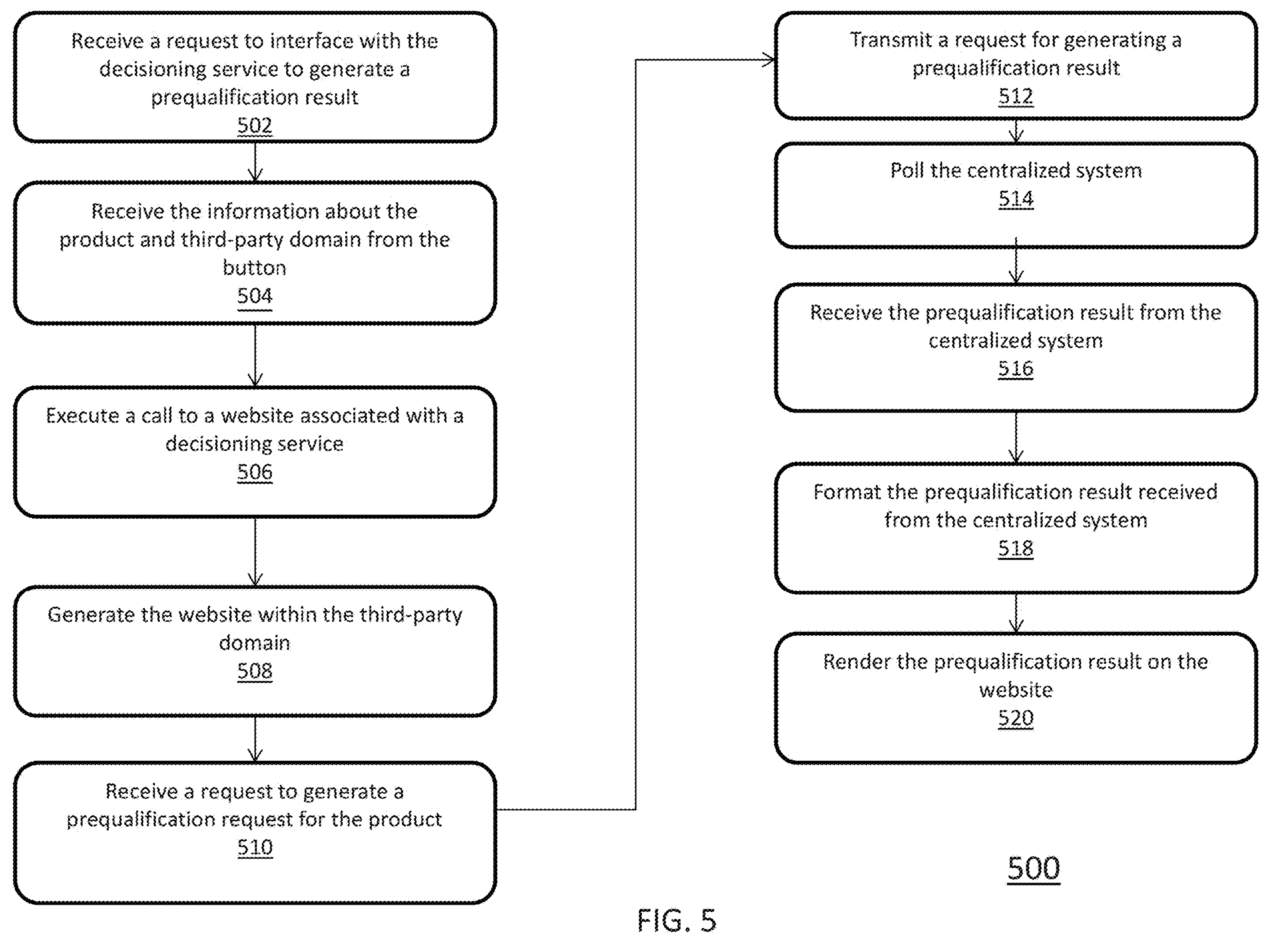
FIG. 5 is a flowchart illustrating the process for interfacing with a decisioning service according to an example embodiment.

FIG. 5 is a flowchart illustrating the process for interfacing with a decisioning service according to an example embodiment.

In operation 502, a backend system receives a request to interface with the decisioning service to generate a prequalification result for a user for a specified product, in response to the actuation of a button included in a third-party web domain rendering a product. The button may include information about the product and the third-party. For example, the button's properties may include information about the product and the third-party. In the event the product is a vehicle, the information may include car make, model, VIN number, year, price, and the like. The third-party may be a dealership, and the third party-domain may be the dealership's website. In this regard, the button's properties may include a dealer identifier.

In operation 504, the backend system receives the information about the product and third party domain from the button, in response to actuation of the button. As described above, the button's properties tab may include information about the product and the third party domain (e.g., dealer identifier). In response to actuating the button, the button can trigger an action to send the request to interface with the decisioning service to generate a prequalification result for a user for a specified product along with the information about the third party domain and the product.

In operation 506, the backend system executes a call to a website associated with a decisioning service.

In operation 508, the backend system generates the website within the third-party domain, including a request for information about the user, in response to executing the call to the website. The website 103 may be embedded in the third-party domain as an Iframe.

In operation 510, the backend system receives a request to generate a prequalification request for the product. The request may include user information.

In operation 512, the backend system transmits a request for generating a prequalification result for the product, to the decisioning service in a centralized system. The request includes information about the user, the product, and the third party. As described above, the product and third party information can be received in response to actuation of the button.

In operation 514, the backend system polls the centralized system for a response to the request for generating the prequalification result.

In operation 516, the backend system receives the prequalification result from the centralized system. The prequalification result can be an actionable prequalification result. That is, the prequalification result can include an APR and projected payments for the specific user and product. In the event, a user selects the prequalification result, a final pricing structure can be generated for the product using the prequalification result. The final pricing structure can include the same APR and projected payments for the specific user and product.

In operation 518, the backend system formats the prequalification result received from the centralized system.

In operation 520, the backend system renders the prequalification result on the website. For example, the prequalification result can be rendered in place of the button on the website. The information rendered on the website can include the APR and the projected payments.

Figure 6:
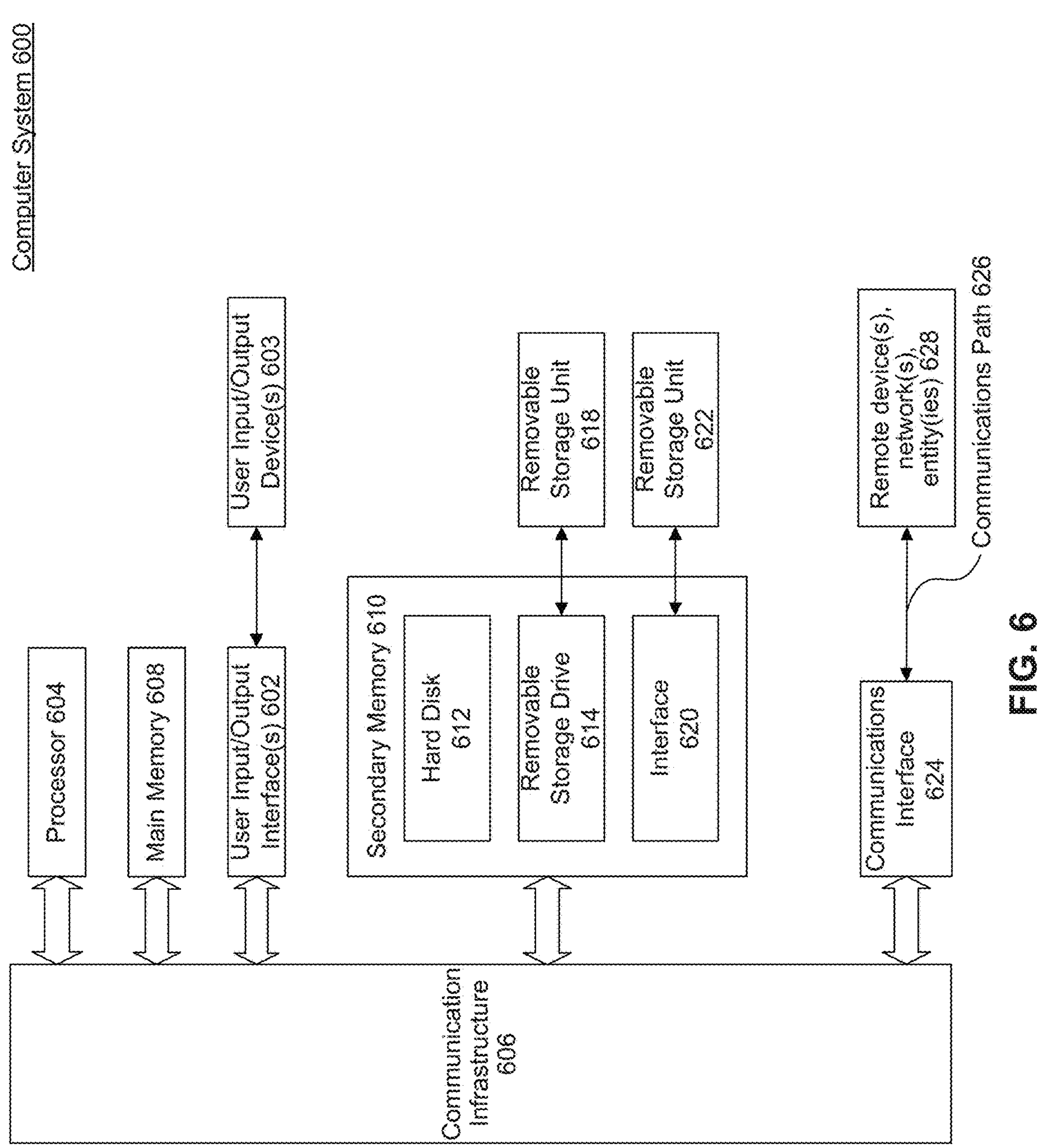
FIG. 6 is a block diagram of example components of a computing system according to an embodiment.

FIG. 6 is a block diagram of example components of computer system 600. One or more computer systems 600 may be used, for example, to implement any of the embodiments discussed herein, as well as combinations and subcombinations thereof. Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614.

Removable storage drive 614 may interact with a removable storage unit 618. Removable storage unit 618 may include a computer-usable or readable storage device having stored thereon computer software (control logic) and/or data. The removable storage unit 618 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 by communication path 626.

Computer system 600 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method comprising:

causing display of a website within a web domain based on interaction with an interactive element of the web domain rendering an item;

generating, based on an indication of the item received responsive to access of the displayed website and respective prequalification rules associated with each respective lender of a plurality of lenders, a respective prequalification result for each lender of the plurality of lenders, wherein each of the respective prequalification rules is stored in a self-contained environment inaccessible to any party other than the respective lender;

rendering the respective prequalification result for each lender of the plurality of lenders in place of the interactive element of the web domain; and generating, based on a selection of a respective prequalification result for a lender of the plurality of lenders, a qualification result for the lender that is displayed within the web domain and facilitates a transaction for the item.

2. The method of claim 1, wherein generating the respective prequalification result for each respective lender of the plurality of lenders comprises generating the respective prequalification result for each respective lender of the plurality of lenders based at least in part on a digital reputation status received from a digital reputation management service.

3. The method of claim 1, further comprising sending a transaction structure for the item to the lender of the plurality of lenders based at least in part on an interaction with the displayed qualification result.

4. The method of claim 3, wherein at least a portion of data indicated by the transaction structure matches a portion of data indicated by the respective prequalification result for the lender of the plurality of lenders.

5. The method of claim 1, further comprising formatting the respective prequalification result for each respective lender of the plurality of lenders based on a formatting rule for the website.

6. The method of claim 1, further comprising terminating the website based at least in part on an interaction with the displayed qualification result or an amount of inactivity on the website satisfying an inactivity threshold.

7. The method of claim 1, wherein the interactive element comprises at least one of a button, a graphical interface, or a hyperlink.

8. A system, comprising:

a memory; and a processor coupled to the memory, the processor configured to perform operations comprising:

causing display of a website within a web domain based on interaction with an interactive element of the web domain rendering an item;

generating, based on an indication of the item received responsive to access of the displayed website and respective prequalification rules associated with each respective lender of a plurality of lenders, a respective prequalification result for each lender of the plurality of lenders, wherein each of the respective prequalification rules is stored in a self-contained environment inaccessible to any party other than the respective lender;

rendering the respective prequalification result for each lender of the plurality of lenders in place of the interactive element of the web domain; and generating, based on a selection of a respective prequalification result for a lender of the plurality of lenders, a qualification result for the lender that is displayed within the web domain and facilitates a transaction for the item.

9. The system of claim 8, wherein generating the respective prequalification result for each respective lender of the plurality of lenders comprises generating the respective prequalification result for each respective lender of the plurality of lenders based at least in part on a digital reputation status received from a digital reputation management service.

10. The system of claim 8, the operations further comprising sending a transaction structure for the item to the lender of the plurality of lenders based at least in part on an interaction with the displayed qualification result.

11. The system of claim 10, wherein at least a portion of data indicated by the transaction structure matches a portion of data indicated by the respective prequalification result for the lender of the plurality of lenders.

12. The system of claim 8, the operations further comprising formatting the respective prequalification result for each respective lender of the plurality of lenders based on a formatting rule for the website.

13. The system of claim 8, the operations further comprising terminating the website based at least in part on an interaction with the displayed qualification result or an amount of inactivity on the website satisfying an inactivity threshold.

14. The system of claim 8, wherein the interactive element comprises at least one of a button, a graphical interface, or a hyperlink.

15. A non-transitory computer-readable medium storing instructions that, when executed by one or more processors of a device, cause the one or more processors to perform operations comprising:

causing display of a website within a web domain based on interaction with an interactive element of the web domain rendering an item;

generating, based on an indication of the item received responsive to access of the displayed website and respective prequalification rules associated with each respective lender of a plurality of lenders, a respective prequalification result for each lender of the plurality of lenders, wherein each of the respective prequalification rules is stored in a self-contained environment inaccessible to any party other than the respective lender;

rendering the respective prequalification result for each lender of the plurality of lenders in place of the interactive element of the web domain; and generating, based on a selection of a respective prequalification result for a lender of the plurality of lenders, a qualification result for the lender that is displayed within the web domain and facilitates a transaction for the item.

16. The non-transitory computer-readable medium of claim 15, wherein generating the respective prequalification result for each respective lender of the plurality of lenders comprises generating the respective prequalification result for each respective lender of the plurality of lenders based at least in part on a digital reputation status received from a digital reputation management service.

17. The non-transitory computer-readable medium of claim 15, the operations further comprising sending a transaction structure for the item to the lender of the plurality of lenders based at least in part on an interaction with the displayed qualification result.

18. The non-transitory computer-readable medium of claim 17, wherein at least a portion of data indicated by the transaction structure matches a portion of data indicated by the respective prequalification result for the lender of the plurality of lenders.

19. The non-transitory computer-readable medium of claim 15, the operations further comprising formatting the respective prequalification result for each respective lender of the plurality of lenders based on a formatting rule for the website.

20. The non-transitory computer-readable medium of claim 15, the operations further comprising terminating the website based at least in part on an interaction with the displayed qualification result or an amount of inactivity on the website satisfying an inactivity threshold.

* * * * *